US006721466B2

(12) United States Patent
Taylor et al.

(10) Patent No.: US 6,721,466 B2
(45) Date of Patent: Apr. 13, 2004

(54) GUIDED WAVE ELECTROOPTIC AND ACOUSTOOPTIC TUNABLE FILTER APPARATUS AND METHOD

(76) Inventors: Henry F. Taylor, Mail Stop 3369, College Station, TX (US) 77843; Ohannes Eknoyan, 202 Suffolk Ave., College Station, TX (US) 77840

( * ) Notice: Subject to any disclaimer, the term of this patent is extended or adjusted under 35 U.S.C. 154(b) by 138 days.

(21) Appl. No.: 09/737,206

(22) Filed: Dec. 14, 2000

(65) Prior Publication Data

US 2001/0038728 A1 Nov. 8, 2001

Related U.S. Application Data

(60) Provisional application No. 60/173,018, filed on Dec. 23, 1999.

(51) Int. Cl.$^7$ .................................................. G02B 6/00
(52) U.S. Cl. ...................................................... 385/11
(58) Field of Search ............................... 385/11, 16, 31, 385/40, 129, 2, 3, 4, 6, 7, 8, 14, 15, 39, 50, 130

(56) References Cited

U.S. PATENT DOCUMENTS

| | | | | |
|---|---|---|---|---|
| 4,197,008 A | * | 4/1980 | Pinnow et al. | 359/484 |
| 4,793,676 A | * | 12/1988 | Risk | 385/1 |
| 5,225,930 A | * | 7/1993 | Land et al. | 359/578 |
| 5,400,171 A | * | 3/1995 | Song | 359/285 |
| 5,455,877 A | * | 10/1995 | Baran et al. | 385/11 |
| 5,748,810 A | * | 5/1998 | Schmid | 385/7 |
| 5,781,670 A | * | 7/1998 | Deacon et al. | 385/10 |

OTHER PUBLICATIONS

Tang et al., Polarization–independent electro–optically tunable wavelength filter in LiTaO3. Electronics Letters, Oct. 13, 1994, vol. 30, No. 21; p. 1758–1759.*

F. Bilodeau, D. C. Johnson, S. Theriault, B. Malo, J. Albert, and K. O. Hill, "An All–Fiber Dense–Wavelength–Division Multiplexer/Demultiplexer Using Photoimprinted Bragg Gratings," IEEE Photon. Technol. Lett. 7, 388–390 (1995).

L. Dong, P. Hua, T. A. Birks, L. Reekie, and P. St. J. Russell, "Novel Add/Drop Filters for Wavelength–Division–Multiplexing Optical Fiber Systems Using a Bragg Grating Assisted Mismatched Coupler," IEEE Photon. Technol. Lett. 8, 1656–1658 (1996).

(List continued on next page.)

Primary Examiner—Frank G. Font
Assistant Examiner—Kevin C Kianni
(74) Attorney, Agent, or Firm—J. Nevin Shaffer, Jr.

(57) ABSTRACT

A two-port guided wave tunable filter in a birefringent electrooptic and/or acoustooptic substrate material includes two 3-port, symmetric Y-branch beam splitters connected by two waveguide sections in which phase-matched polarization coupling occurs, with an input port and an output port. The optical path difference between the beam splitters is half an optical wavelength, and the polarization coupling regions between the beam splitters are relatively displaced by an odd integral multiple of half the spatial period of the perturbation responsible for the coupling. In one embodiment, an electrooptic tunable filter, the polarization coupling in the waveguides is caused by a spatially periodic strain-inducing film and tuning results from an applied electric field. In another embodiment, an acoustooptic tunable filter, polarization coupling results from a surface acoustic wave and tuning is accomplished by changing the acoustic frequency. Alternatively, four port electrooptic and acoustooptic tunable filters are formed by replacing the 3-port beam splitters with 4-port directional couplers, where in each of the directional couplers the splitting ratio for TE input polarization plus the splitting ratio for TM input polarization is substantially equal to one.

7 Claims, 7 Drawing Sheets

OTHER PUBLICATIONS

K. Hsu, C. M. Miller, and Y. Bao, "Fiber Fabry—Perot Interferometers with Very Low Polarization Sensitivity," Appl. Opt. 33, 6617–6620 (1994).

L. Stone and L. W. Stulz, "High–Performance Fibre Fabry—Perot Filters," Electron. Lett. 27, 2239–2240 (1991).

C. Dragone, "An NxN Optical Multiplexer Using a Planar Arrangement of Two Star Couplers," IEEE Photonics Technol. Lett. 3, 812–815 (1991).

C. Dragone, "Efficient Techniques for Widening the Passband of a Wavelength Router," J. Lightwave Technol. 16, 1895–1906 (1998).

E. L. Wooten, R. L. Stone, E. W. Miles, and E. M. Bradley, "Rapidly Tunable Narrowband Wavelength Filter Using LiNbO3 Unbalanced Mach—Zehnder Interterometers," J. Lightwave Technol. 14, 2530–2536 (1996).

C. Kostrzewa, R. Moosburger, G. Fischbeck, B. Schuppert, and E. Petermann, "Tunable Polymer Optical Add/Drop Filter for Multiwavelength Networks," IEEE Photon. Technol. Lett., 9, 1487–1489 (1997).

F. Tian, C. Harizi, H. Herrmann, V. Reimann, R. Ricken, U. Rust, W. Sohler, F. Wehrmann, and S. Westenhofer, Polarization–Independent Integrated Optical Acoustically Tunable Double–Stage Wavelength Filter in LiNbO$_3$(1994).

D. A. Smith, R. Chakravarthy, Z. Bao, J. E. Baran, J. L. Jackel, A. d'Alessandro, D. J. Fritz, S. H. Huang, X. Y. Zou, S. M. Hwang, A. E. Willner, and K. D. Li, "Evolution of the Acousto–Optic Wavelength Routing Switch," J. Lightwave Technol. 14, 1005–1019 (1996).

W. Warzanskyj, F. Heismann, and R. C. Alferness, "Polarization Independent Electro–Optically Tunable Narrow–Band Wavelength Filter," Appl. Phys. Lett. 53, 13–15 (1988).

Z. Tang, O. Eknoyan, and H. F. Taylor, "Polarisation–Independent Electro–optically Tunable Wavelength Filter in LiTaO3," Electron. Lett. 30, 1758–1759 (1994).

P. E. Green, Jr., Fber Optic Networks, (Prentice Hall, Englewood Cliffs, NJ, 1993), Chapter 4.

H. F. Taylor and A. Yariv, "Guided Wave Optics," Proc. IEEE 62, 1044–1060 (1974).

C. S. Tsai, "Guided–Wave Acoustooptic Bragg Mudulators for Wide–Band Integrated Optic Communications and Signal Process " IEEE Trans Circuits and Systems 26 (1979).

T. Pohlman, A. Neyer, and E. Voges, "Polarization Independent Ti:LiNbO3 Switches and Filters," IEEE J. Quantum Electron, 27, 602–607 (1991).

F. Wehrmann, C. Harizi, H. Herrmann, U. Rust, W. Sohler and S. Westenhofer, "Integrated Optical, Wavelength Selective, Acoustically tunable 2×2 Switches (Add Drop Multiplexers) in LiNbO3," IEEE J. Selected Topics Quantum Electron. 2, 263–269 (1996).

A. D'Alessandro, D. A. Smith, and J. Baran, "Multichannel Operation of an Integrated Acousto–Optic Wavelength Routing for WDM Systems" IEEE Photon Technology Letters vol. 6. No. 2 390–393 (1994).

* cited by examiner

Fig. 1. Conventional AOTF design.

Fig. 2. Conventional EOTF design.

Fig. 3. Four-port beam splitter.

Fig. 4. New 4-Port AOTF design.

Fig. 5. New 4-Port EOTF design.

Fig. 6. New 2-Port AOTF design.

Fig. 7. New 2-Port EOTF design.

GUIDED WAVE ELECTROOPTIC AND ACOUSTOOPTIC TUNABLE FILTER APPARATUS AND METHOD

The Applicant hereby claims the benefit of the earlier filing date of Dec. 23, 1999, of Provisional Application Ser. No. 60/173,018, under 35 U.S.C. §119(e).

STATEMENT REGARDING FEDERALLY SPONSORED RESEARCH OR DEVELOPMENT

The U.S. Government has a paid-up license in this invention and the right in limited circumstances to require the patent owner to license others on reasonable terms, as provided for by the terms of Project No. 32192-72220 sponsored by the State of Texas and Project No. 32525-57570 sponsored by Lockheed Martin Corporation.

BACKGROUND OF THE INVENTION

This invention relates to an apparatus and method for the selection of light of one optical frequency or wavelength channel from a multiplicity of channels or optical frequencies being transmitted in an optical fiber or optical waveguide. The invention can also be used to efficiently combine light waves of different frequencies.

Filter technology for wavelength division multiplexing (WDM) is one of the most active research and development topics in the optical fiber telecommunications field. A number of guided wave filter approaches are at various stages of development, including the fiber Bragg grating, fiber Fabry-Perot, asymmetrical Mach Zehnder interferometer (MZI), waveguide grating router (WGR), acoustooptic tunable filter (AOTF), and electrooptic tunable filter (EOTF).

Figure 1:
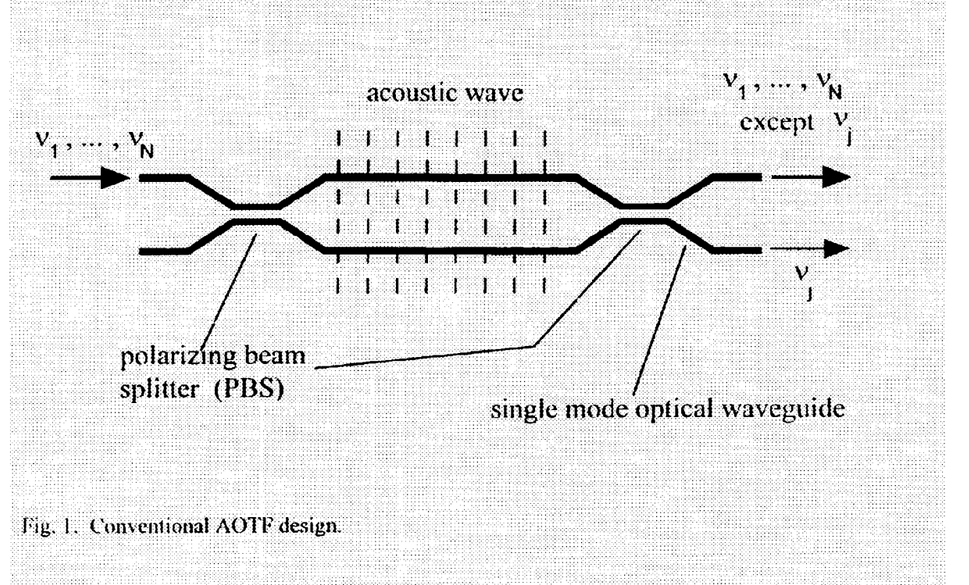
FIG. 1 is an illustration of a Prior Art AOTF.
Figure 2:
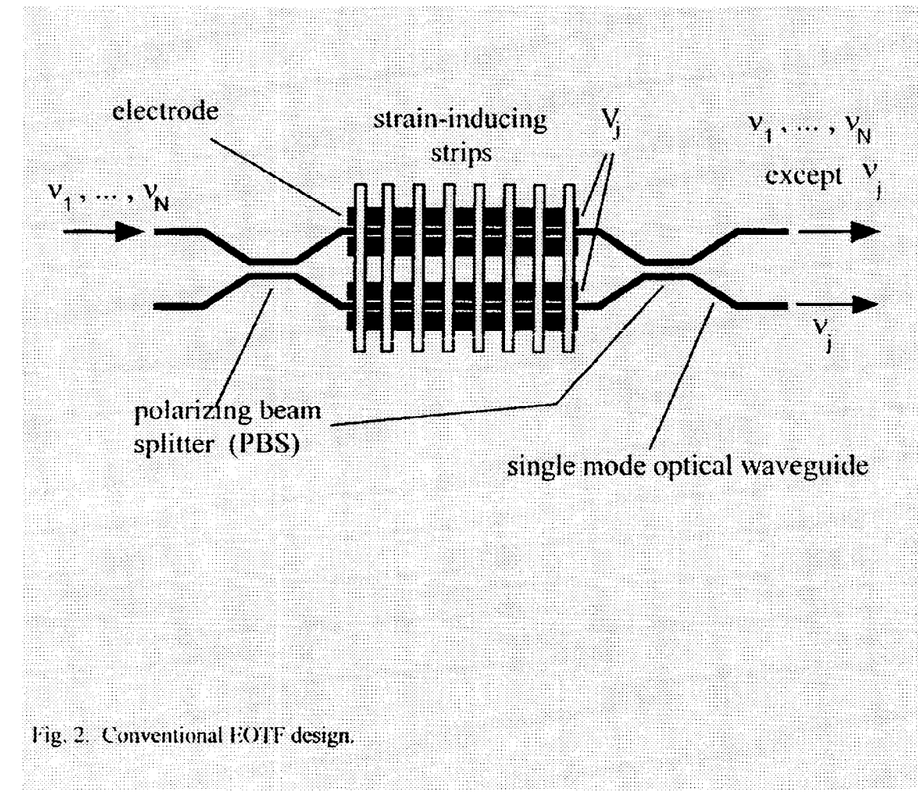
FIG. 2 is an illustration of a Prior Art EOTF.

Of these technologies, only the AOTF and EOTF can be tuned from one channel to another at near-microsecond (for the AOTF) or sub-microsecond (for the EOTF) speeds needed for fast packet-switched networks. As illustrated in FIGS. 1 and 2, conventional, prior art, schemes for implementing the AOTF and EOTF have several features in common. Both are fabricated in ferroelectric insulating substrates such as lithium niobate, and make use of a four-port MZI structure formed from waveguides which are single mode for both horizontally polarized light (TE) and vertically polarized light (TM). Both filters make use of phase-matched polarization conversion in the arms of the MZI, and ideally their performance is independent of the incident polarization state. Another common feature of the conventional AOTF and EOTF designs is that they both use polarizing beam splitters (PBSs), optical circuit elements which have proven difficult to fabricate with the high polarization extinction ratios needed to meet filter requirements.

Figure 3:
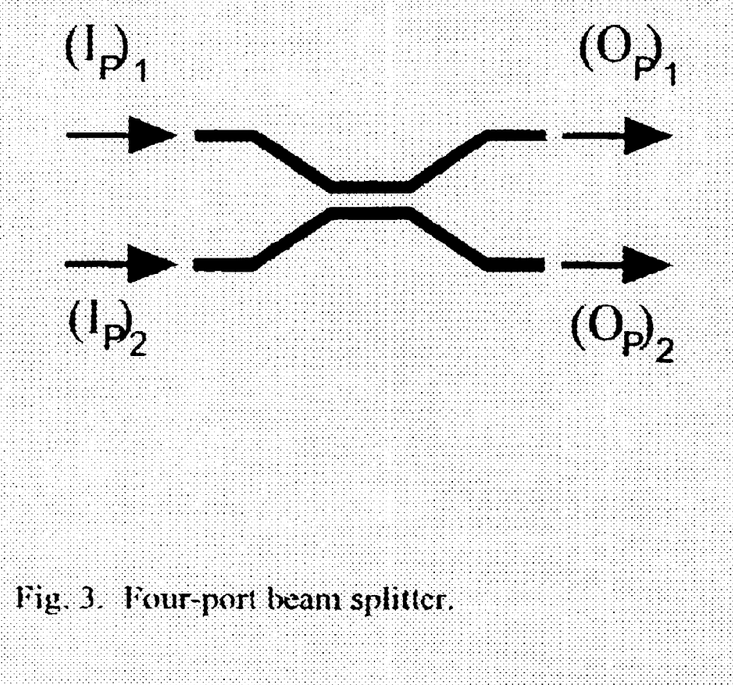
FIG. 3 is an illustration of a Prior Art four-port beam splitter.

A prior art four-port beam splitter is illustrated in FIG. 3. Light incident in port 1 will, in general, be split between output port 1 (straight through port) and output port 2 (crossover port). The requirement for a PBS is that, for i,j=1,2: $(f_{TE})_{ii}=1$; $(f_{TE})_{ij}=0$, $j \neq i$; $(f_{TM})_{ii}=0$; $(f_{TM})_{ij}=1$, $j \neq i$, where $(f_P)_{ij}$ is the fraction of the power in input port i which couples to output port j for polarization P. (It should be noted that an alternative PBS design is obtained by reversing "TE" and "TM" in these expressions). As more fully disclosed hereafter, Applicants' invention is directed to new AOTF and EOTF configurations which allow for an additional degree of freedom in beam splitter characteristics and which are, therefore, much easier to fabricate than the conventional filters.

Principles of Operation of Conventional AOTFs and EOTFs

The prior art AOTF depicted in FIG. 1 makes use of the strain-optic effect from a traveling acoustic wave to produce polarization conversion in the two arms of the MZI structure, which is fabricated on a $LiNbO_3$ substrate. The conversion is very efficient at the optical frequency $v_j$ for which a phase matching condition is satisfied, such that the acoustic wavelength exactly matches the TE-TM polarization beat length in the waveguide. At other optical frequencies for which the phase matching condition is not satisfied, little polarization conversion occurs. Horizontally polarized (TE) light incident on the filter at a frequency $v_i$ is directed by the first PBS into its straight through output port—the upper waveguide in the Mach-Zehnder. If the polarization is not converted in that waveguide (i≠j), the light incident on the second PBS is also directed to its straight through output port, which is the upper output port of the filter. If the polarization is converted (i=j), the light incident on the second beam splitter emerges from its crossover port, which is the filter's lower output port.

On the other hand, vertically polarized (TM) light incident on the filter at a frequency $v_i$ is directed by the first PBS into its crossover output port, the lower waveguide in the MZI. If the polarization is not converted in that waveguide (i≠j), the light incident on the second PBS is also directed to its crossover port, the filter's upper output port. If the polarization is converted (i=j), the light incident on the second beam splitter emerges from its straight through output port, which is the filter's lower output port. Thus, for either polarization, TE or TM, the light at the selected frequency $v_j$ emerges from the lower output port of the filter, and all other frequencies exit via the upper output port. Tuning of the filter to change the selected optical frequency is accomplished by changing the acoustic frequency.

Conceptually, the conventional EOTF differs from the AOTF in two respects: both the polarization coupling mechanism and the tuning method are different. In the EOTF illustrated in FIG. 2, tuning is accomplished by an applied voltage $V_j$ which changes the waveguide birefringence and hence the optical frequency $v_j$ for which phase matching occurs. A spatially periodic strain-inducing film causes polarization coupling via the strain-optic effect. In other EOTF designs, a spatially periodic electric field produced by an interdigital electrode structure induces the polarization coupling via the electrooptic effect.

Beam Splitter Description

Performance of the four-port beam splitter of FIG. 3 is described by the expression $$O_P = C_P I_P, \quad (1)$$

with $$I_P = \begin{bmatrix} (I_P)_1 \\ (I_P)_2 \end{bmatrix}, \quad (2)$$

$$O_P = \begin{bmatrix} (O_P)_1 \\ (O_P)_2 \end{bmatrix}, \quad (3)$$

and $$C_P = \begin{bmatrix} (c_P)_{11} & (c_P)_{12} \\ (c_P)_{12} & (c_P)_{11} \end{bmatrix} \quad (4)$$

In these expressions P represents the polarization (TE or TM), $(I_P)_i$ is the input electric field amplitude in port i (i=1,2), $(O_P)_i$ is the corresponding output electric field amplitude, and the coupling coefficients are $$(c_P)_{11} = \cos(\kappa_P L) \quad (5)$$

$$(c_P)_{12} = i\sin(\kappa_P L), \quad (6)$$

with $\kappa_P$ the interwaveguide coupling coefficient and L the effective length of the coupling region. The analysis neglects loss and assumes that the coupled waveguides are identical and support a single mode for each polarization, but that in general the mode field patterns and hence the coupling coefficients are different for the two polarizations.

For a polarizing beam splitter with TE polarization directed in the straight through path and TM polarization crossing over, the coupling coefficients must satisfy these conditions: $(c_{TE})_{11}=1$, $(c_{TE})_{12}=0$; $(c_{TM})_{11}=0$; $(c_{TM})_{12}=1$. For these relations to hold, $\kappa_{TM}L=(2m_1-1)\pi/2$, $\kappa_{TE}L=m_2\pi$, with $m_1$ and $m_2$ positive integers. Thus, constraints on both coupling coefficients must be met simultaneously to satisfy the requirements for a PBS. Furthermore, from a practical standpoint it is desirable to make the coupler as short as possible, implying small values of $m_1$ and $m_2$. For $m_1=m_2=1$, for example, $\kappa_{TM}L=\pi/2$ and $\kappa_{TE}L=\pi$, so $\kappa_{TE}=2\kappa_{TM}$. This implies a considerably broader mode profile for the TE mode than for the TM mode, which is undesirable from the standpoint of mode matching to an optical fiber.

SHORT STATEMENT OF THE INVENTION

Accordingly, as opposed to those now known in the industry, the AOTF and EOTF apparatus and methods of the present invention do not require polarizing beam splitters. Further, because the invention provides an additional degree of freedom in achieving the required beam splitter performance, it is much easier to fabricate than prior art AOTFs and EOTFs which make use of polarizing beam splitters. In particular, a guided wave tunable filter of the present invention includes, in a preferred embodiment, two 3-port Y-branch beam splitters connected to form two spaced apart waveguides between said beam splitters, with an input port and an output port. The waveguides include an optical path difference of half a wavelength and polarization coupling regions in the two waveguides are displaced by half the spacial period of a pertubation responsible for coupling. Both acoustooptic and electrooptic tunable filters of the two port design are disclosed. Additionally, in a preferred embodiment, a four port AOTF and a four port EOTF are also disclosed.

BRIEF DESCRIPTION OF THE DRAWINGS

Other objects, features and advantages of the present invention will become more fully apparent from the following detailed description of the preferred embodiment, the claims and the accompanying drawings in which:

DETAILED DESCRIPTION OF THE PREFERRED EMBODIMENT

Figure 4:
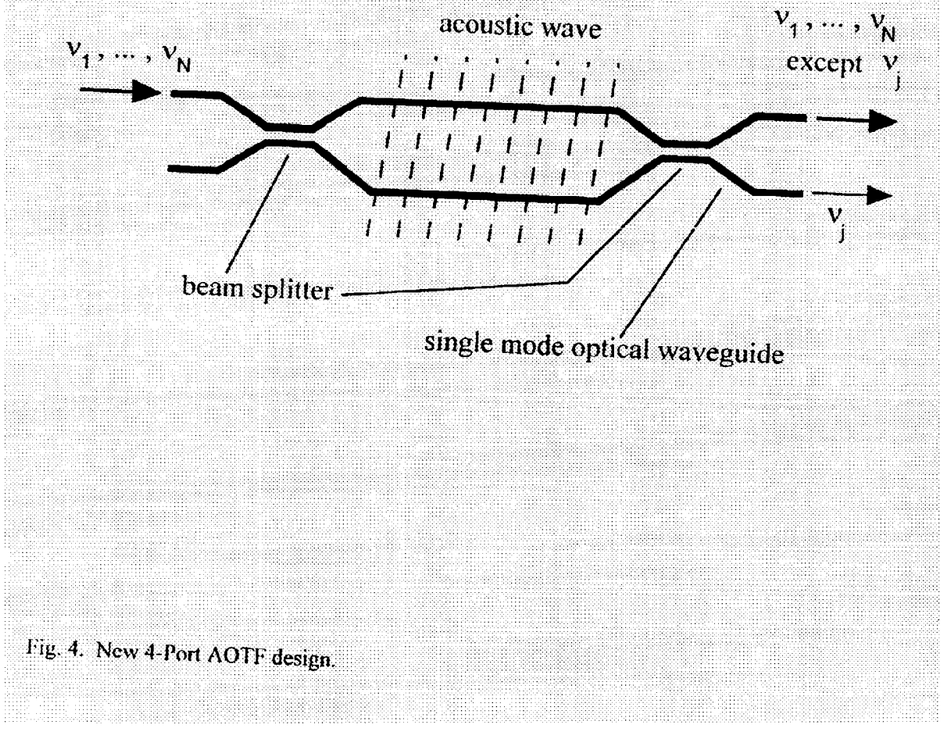
FIG. 4 is an illustration of a preferred embodiment of a four-port AOTF of the present invention.
Figure 5:
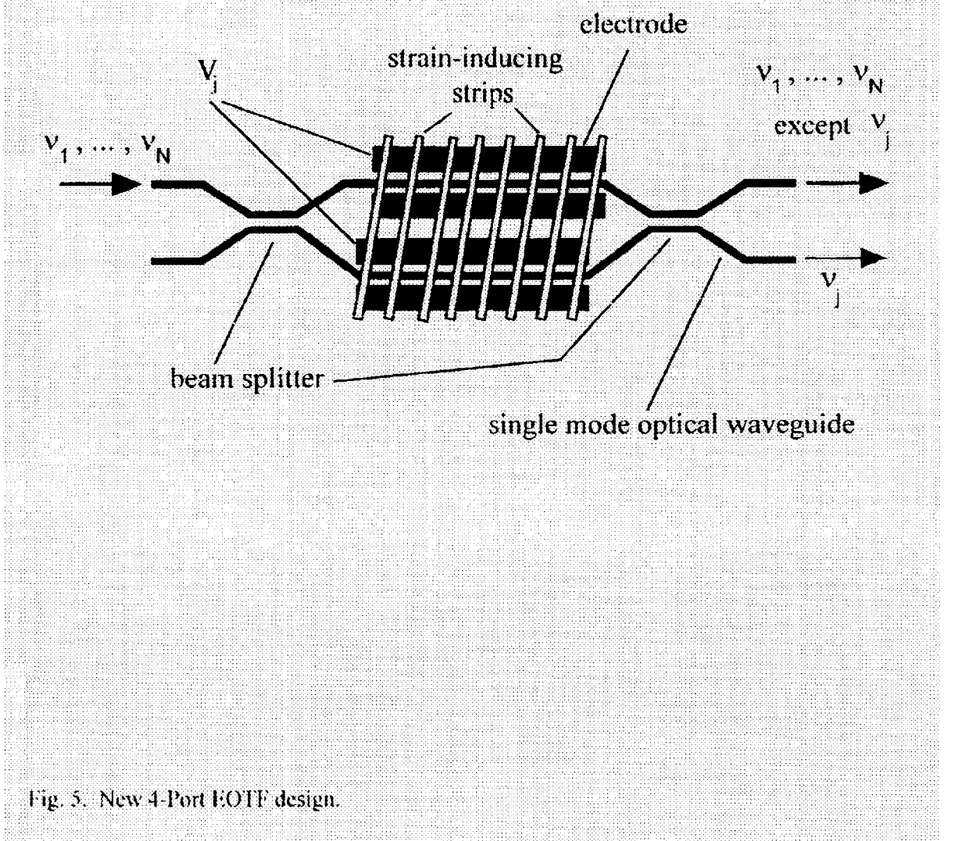
FIG. 5 is an illustration of a preferred embodiment of a four-port EOTF of the present invention.

The preferred embodiment of the present invention is illustrated by way of example in FIGS. 4–7. Filter designs introduced here for the purpose of relaxing constraints on beam splitter characteristics are illustrated in FIGS. 4 and 5. In general, these differ from the conventional designs of prior art FIGS. 1 and 2 in the following respects: (1) polarizing beam splitters are not required, (2) the optical path difference for the waveguides between the beam splitters for both polarizations is a half-wavelength, or an odd integral multiple thereof, and (3) the relative positions of the polarization coupling regions in the two waveguides are displaced in the propagation direction by half the spatial period of the perturbation responsible for the coupling.

To analyze these new filter designs, the case of P polarization input with no polarization conversion is considered first. The transfer matrix for the filter is given by $$O_P = C_P M_\pi C_P I_P \quad (7)$$

with $M_\pi$ the matrix which describes the pi-radian relative phase shift due to the half-wavelength path difference, given by $$M_\pi = \begin{bmatrix} 1 & 0 \\ 0 & -1 \end{bmatrix} \quad (8)$$

Evaluating the matrix product in eq. (7) yields $$O_P = \begin{bmatrix} (c_P)_{11}^2 - (c_P)_{12}^2 & 0 \\ 0 & (c_P)_{12}^2 - (c_P)_{11}^2 \end{bmatrix} I_P \quad (9)$$

It follows from equations (5) and (6) that $$O_P = M_\pi I_P \quad (10)$$

Since $M_\pi$ is diagonal, all of the power incident in port i in either polarization exits from output port i. This represents the case of the non-selected frequencies for which no polarization conversion occurs in the waveguides. Power incident in port i couples part of the way to port j in the first coupler, but then couples back to port i in the second coupler.

For the case that polarization conversion occurs between incident polarization P and output polarization P', the transfer matrix is given by $$O_{P'} = C_{P'} M_\pi M_\pi C_P I_P. \quad (11)$$

In this case, the light passes through the first coupler with polarization P and through the second coupler with polarization P'. The second factor $M_\pi$ in eq. (11) accounts for the relative displacement of the coupling regions in the waveguides by half the spatial period of the pertubation responsible for the polarization coupling. Since $M_\pi M_\pi$ equals the unitary matrix, eq. (11) immediately simplifies to $$O_{P'} = C_{P'} C_P I_P. \quad (12)$$

From eqs. (4)–(6), and making use of the trigonometric relations $\cos(A+B) = \cos A \cos B - \sin A \sin B$ and $\sin(A+B) = \sin A \cos B + \cos A \sin B$, it follows that $$C_P, C_P = \begin{bmatrix} \cos(\Theta) & i\sin(\Theta) \\ i\sin(\Theta) & \cos(\Theta) \end{bmatrix} \quad (13)$$

with $$\Theta = \kappa_{TE}L + \kappa_{TM}L. \quad (14)$$

where "TE" and "TM" have replaced "P" and "P'". The condition for complete power crossover to occur, such that all power incident in port i exits via output port j, is $\cos \Theta = 0$, or $\Theta = (2 m_3 - 1)\pi/2$, with $m_3$ a positive integer. For the shortest couplers, with $m_3 = 1$, $\Theta = \pi/2$. It follows from eqs. (5), (6), and (14) that a condition for complete power crossover can be written $$(f_{TE})_{ii} + (f_{TM})_{ii} = 1 \quad (15)$$

for i=1 or 2, where $(f_P)_{ij}$ is the fraction of incident power with polarization P incident on the coupler in port j which exits via port i, given by $$(f_P)_{ij} = |c_P|_{ij}^2 \quad (16)$$

ALTERNATIVES

As illustrated in FIGS. 4 and 5, the disclosed filters of the present invention perform the "drop" function of removing one optical wavelength or frequency and allowing all others to propagate. These same filters can perform the "add" function, as illustrated by the same FIGS. 4 and 5 with the direction of the light propagation (as indicated by arrows in the diagrams) reversed.

Tuning of the apparatus shown in FIGS. 4 and 5 enables the achievement of optimum performance in various circumstances. In every circumstance, it is required that the optical path difference in the MZI equal an odd integral multiple of a half wavelength, which is satisfied by a physical path difference of 350 nm in LiNbO₃ at 1.53 μm wavelength for extraordinary polarization. For this path difference, a phase error of about 0.1 rad results for the ordinary polarization due to the large substrate birefringence. This error is readily compensated by a section of waveguide outside the polarization conversion region in which the birefringence is altered by either a strain-inducing film or an electrooptic interaction.

It should also be noted that, in the case of the AOTF, the relative displacement of the polarization coupling regions in the two waveguides as a fraction of the polarization beat length in the waveguides changes with tuning of acoustic frequency. The effect is significant, amounting to about ±0.15 rad for tuning of the optical frequency by ±1 THz, but is correctable through the use of a phased array or tilted finger chirped acoustic transducer design in which the propagation direction of the acoustic wave changes in angle linearly with acoustic frequency.

The condition given in eq. (15), which must be satisfied by couplers for the new filter designs of the present invention, can readily be achieved in practice. For example, in a preferred embodiment, the effective coupling length L and the waveguide width are fixed a priori, with coupling strengths $\kappa_P$ for the two polarizations determined by an appropriate choice of waveguide separation. The $\kappa_P$ values are both monotonically decreasing functions of waveguide separation. By measuring $(f_{TE})_{ii}$ and $(f_{TM})_{ii}$ for test coupler patterns with different waveguide separations, a separation for which eq. (15) is satisfied can readily be determined.

Since the filters of the present invention will be used in fiber optic systems, it is desirable to match the mode electric field patterns for both polarizations as closely as possible to a single mode fiber field pattern. This is a consideration in determining the waveguide fabrication procedure. For example, if the waveguides are formed by Ti diffusion in LiNbO₃, the diffusion time and temperature should be chosen with this in mind. Even so, it is expected that there would be significant differences in the TE and TM mode profiles, which would be reflected in the coupling constant values $\kappa_{TE}$ and $\kappa_{TM}$. These differences, however, do not pose a problem in implementing the new filter designs of the present invention.

By contrast, two constraints must be satisfied simultaneously for the PBSs used in conventional tunable filter designs, making it much more difficult to achieve the needed coupler performance. Thus, the invention considers a PBS optimization procedure in which the waveguide width and coupling length are fixed and the waveguide separation is varied. A waveguide separation for which complete crossover is achieved for TE polarization would not, in general, also meet the companion requirement of providing complete straight through propagation for the TM polarization.

In practice, considerable prior art effort has been devoted to solving the PBS problem for tunable filters by using two mode interference and Ti-indiffused/proton exchanged waveguide combinations. Although polarization extinction ratios >20 dB have been reported, the techniques to achieve them are complicated and reproducibility has been a major problem. Due to difficulties with the integrated PBSs, some AOTF demonstrations have utilized bulk PBSs external to the LiNbO₃ substrate in which the acoustooptic interaction takes place.

Figure 6:
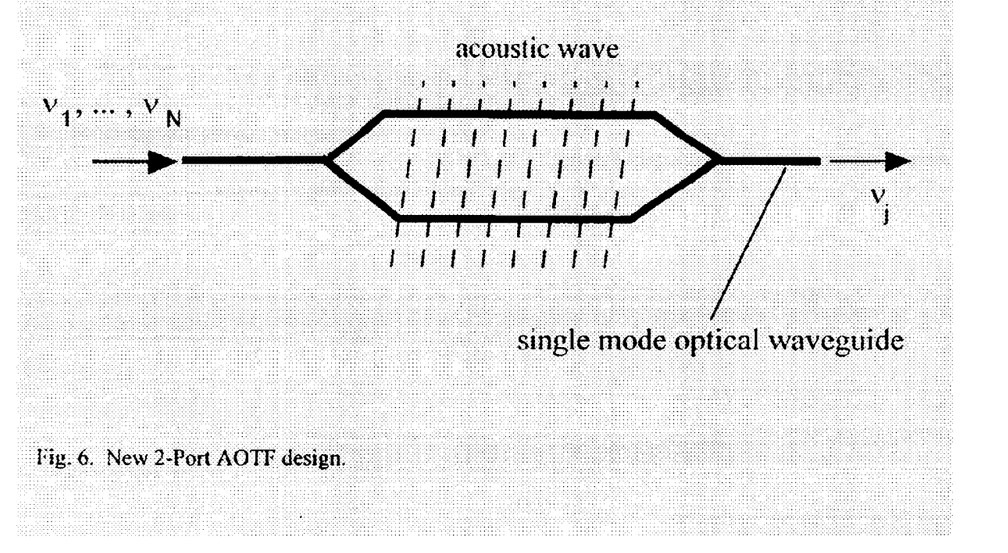
FIG. 6 is an illustration of a preferred embodiment of a two-port AOTF of the present invention.
Figure 7:
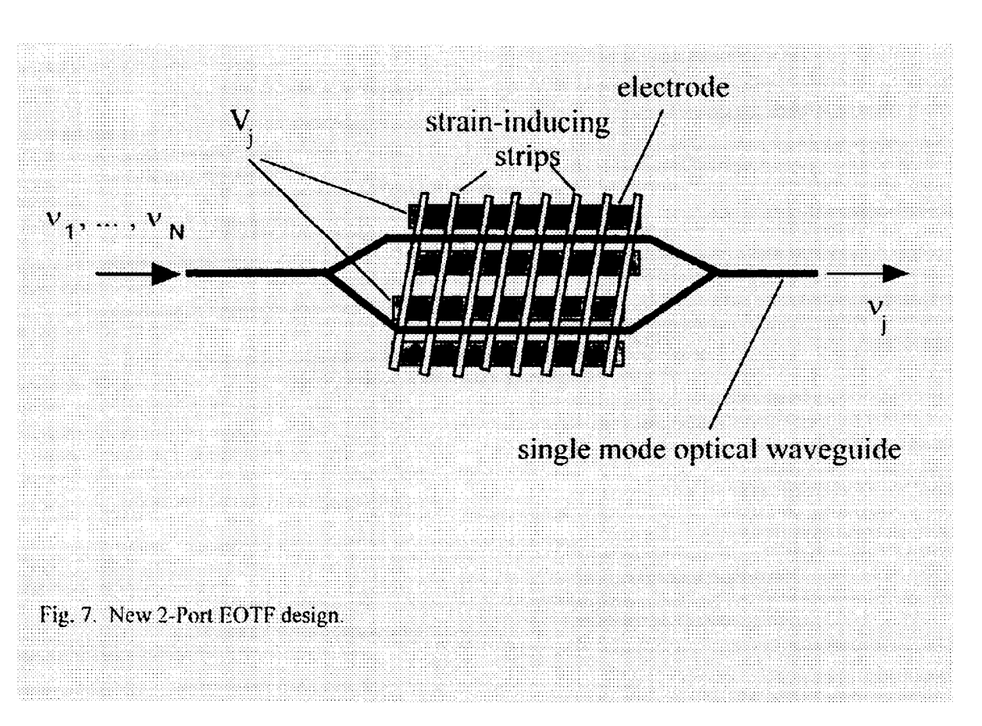
FIG. 7 is an illustration of a preferred embodiment of a two-port EOTF of the present invention.

Simpler 2-port filters of the present invention, designed using the same principles as the 4-port devices, are illustrated in FIGS. 6 and 7. These 2-port filters are designed to transmit a selected wavelength channel and block all others. In the 2-port filters, two 3-port Y-branches replace the two 4-port beam splitters employed in the designs of FIGS. 4 and 5. If the 3-port branches are symmetric, the splitting ratios will be 50% for both polarizations and the condition of eq. (15) is automatically satisfied. As with the 4-port filters of the present invention, the optical path difference for the waveguides between the beam splitters for both polarizations is a half-wavelength, or odd integral multiples thereof, and the relative positions of the polarization coupling regions in the two waveguides are displaced in the propagation direction by half the spatial period of the pertubation responsible for the coupling.

What is claimed is:

1. A guided wave optical tunable filter for adding one selected frequency channel to a substantially broad range of optical frequencies in an incident light wave, and for dropping said selected frequency channel from said substantially broad range of optical frequencies in an incident light wave, comprising (a) a substrate of birefringent material which exhibits the linear (Pockels) electrooptic effect and the linear strain-optic effect;

(b) an optical waveguide structure which supports a single mode for both TE and TM polarization formed on said substrate; said optical waveguide structure consisting of a first straight initial throughput section and a second straight initial add section joined in continuous fashion to the two input pots of a first four port directional coupler, first and second polarization conversion/ electrooptic tuning sections, and a second four port directional coupler of which the two output ports are joined in continuous fashion to a first straight final throughput section and a second straight final drop section; wherein said first initial throughput section is positioned to receive said incident light wave and said first initial add section is positioned to receive input light in said selected frequency channel; wherein said first and second polarization conversion/electrooptic tuning sections provide continuous optical paths between said first and second four port directional couplers; wherein said first final throughput section transmits said incident light wave plus light in said selected frequency channel coupled into said initial add section minus light in said selected frequency channel coupled out of said final drop section; wherein said second final drop section transmits light in said selected frequency channel coupled out of said final drop section; wherein optical path length experienced by a TE light wave in traversing said straight initial throughput section, said first four port directional coupler, said first polarization conversion/electrooptic tuning section, said second four directional coupler, and said straight final drop section differs from the optical path length experienced by a TE light wave in traversing said straight initial throughput section, said first four port directional coupler, said second polarization conversion/electrooptic tuning section, said second four port directional coupler, and said straight final drop section by half an optical wavelength;

(c) a multiplicity of strain-inducing strips of a dielectric material situated on top of said polarization conversion/ eletrooptic tuning waveguide sections; said strain-inducing strips having a spatial periodicity Λ such that substantially complete phase-matched polarization conversion occurs in said first and second polarization conversion/electrooptic tuning waveguide sections at said selected optical frequency within said broad range of optical frequencies; said strain-inducing strips situated on top of first polarization conversion/electrooptic tuning waveguide section being offset in position from said strain-inducing strips situated on top of second polarization conversion/electrooptic tuning waveguide section by an odd integral multiple of Λ/2, wherein said positions are measured relative to said first four-port directional coupler;

(d) a source of applied voltage V;

(e) electrodes disposed to produce an electric field in and around said first and second polarization conversion/ eletrooptic tuning sections in response to said applied voltage V; wherein said electric field causes a change in the birefringence in said first and second polarization conversion/electrooptic tuning waveguide sections such that said selected optical frequency is tuned in proportion to said applied voltage; and (f) means connecting said source of applied voltage to said electrodes;

(g) wherein said first four port directional coupler and said second four port directional coupler each satisfy the condition that the sum of the fraction of optical power in TE polarization coupled into a particular input port which exits through a particular output port plus the fraction of optical power in TM polarization coupled into said particular input port which exits through said particular output port is substantially equal to unity.

2. The apparatus of claim 1 wherein said substrate material is lithium niobate.

3. The apparatus of claim 1 wherein said substrate material is lithium tantalate.

4. The apparatus of claim 1 wherein said strain inducing strips comprise a film of fused silica deposited uniformly on said substrate at a temperature >250° C. and patterned lithographically at or near room temperature.

5. A guided wave optical tunable filter for adding one selected frequency channel to a substantially broad range of optical frequencies in an incident light wave, and for dropping said selected frequency channel from said substantially broad range of optical frequencies in an incident light wave, comprising:

(a) a substrate of birefringent material which exhibits the linear (Pockels) electrooptic effect and the linear strain-optic effect;

(b) an optical waveguide structure which supports a single mode for both TE and TM polarizations formed on said substrate; said optical waveguide structure consisting of a first straight initial throughput section and a second straight initial add section joined in continuous fashion to the two input ports of a first four port directional coupler, first and second polarization conversion/ electooptic tuning sections, and a second four port directional coupler of which the two output ports are joined in continuous fashion to a first straight final throughput section and a second straight final drop section; wherein said first initial throughput section is positioned to receive said incident light wave and said first initial add section is positioned to receive input light in said selected frequency channel; wherein said first and second polarization conversion/electrooptic tuning sections provide continuous optical paths between said first and second four port directional couplers; wherein said first final throughput section transmits said incident light wave plus light in said selected frequency channel coupled out of said final drop section; wherein said second final drop section transmits light in said selected frequency channel coupled out of said final drop section; wherein optical path length experienced by a TE light wave in traversing said straight initial throughput section, said first four port directional coupler, said first polarization conversion/electrooptic tuning section, said second four port directional coupler, and said straight final drop section differs form the optical path length experienced by a TE light wave in traversing said straight initial throughput section, said first four port directional coupler, said second polarization conversion/ electrooptic tuning section, said second four port directional coupler, and said straight final drop section by half an optical wavelength;

(c) a multiplicity of strain-inducing strips of a dielectric material situated on top of said polarization conversion/ electrooptic tuning waveguide sections; said strain-inducing strips having the effect of inducing polarization coupling in said polarization conversion/ electrooptic tuning waveguide sections; said strain-inducing strips having a spatial periodicity Λ such that substantially complete phase-matched polarization conversion occurs in said first and second polarization conversion/electrooptic tuning waveguide sections at said selected optical frequency within said broad range of optical frequencies; said strain-inducing strips situated on top of first polarization conversion/electrooptic tuning waveguide section being offset in position from said strain-inducing strips situated on top of second polarization conversion/electrooptic tuning waveguide section by an odd integral multiple of Λ/2, wherein said positions are measured relative to said first four-port directional coupler and wherein said strain inducing strips comprises a film of fused silica deposited uniformity on said substrate at a temperature >250° C. and patterned lithographically at or near room temperature;

(d) a source of applied voltage V;

(e) electrodes disposed to produce an electric field in and around said first and second polarization conversion/electrooptic tuning sections in response to said applied voltage V; wherein said electric field causes a change in the birefringence in said first and second polarization conversion/eletrooptic tuning waveguide sections such that said selected optical frequency is tuned in proportion to said applied voltage;

(f) means connecting said source of applied voltage to said electrodes; and (g) wherein said first four port directional coupler and said second four port directional coupler each satisfy the condition that the sum of the fraction of optical power in TE polarization coupled into a particular input port which exits through a particular output port plus the fraction of optical power in TM polarization coupled into said particular input port which exits through said particular output port is substantially equal to unity.

6. The apparatus of claim 5 wherein said substrate material is lithium niobatel.

7. The apparatus of claim 5 wherein said substrate material is lithium tantalate.

* * * * *

UNITED STATES PATENT AND TRADEMARK OFFICE
CERTIFICATE OF CORRECTION

PATENT NO.   : 6,721,466 B2
DATED        : April 13, 2004
INVENTOR(S)  : Henry F. Taylor and Ohannes Eknoyan It is certified that error appears in the above-identified patent and that said Letters Patent is hereby corrected as shown below:

Column 6,
Line 64, "pots" should read -- ports --.

Column 7,
Line 21, "said second four directional coupler" should read -- said second four port directional coupler --.
Line 32, "inducing strips having a spatial periodicity" should read -- inducing strips having the effect of inducing polarization coupling in said polarization conversion/ electrooptic tuning waveguide sections; said stain-inducing strips having a spatial periodicity --

Column 8,
Line 34, "selected frequency channel coupled out of said final drop section" should read -- selected frequency channel coupled into said initial add section minus light in said selected frequency channel coupled out of said final drop section; --

Signed and Sealed this

Fourteenth Day of December, 2004

JON W. DUDAS
*Director of the United States Patent and Trademark Office*